United States Patent [19]

Rohringer et al.

[11] 4,382,884
[45] May 10, 1983

[54] FIRE-RETARDANT, INTUMESCENT COMPOSITION AND ITS USE FOR THE FLAMEPROOFING OF SUBSTRATES, AND AS A FIRE-EXTINGUISHING AGENT COMPRISING AN AMMONIUM SALT, A WATER-SOLUBLE NITROGEN COMPOUND AS A BLOWING AGENT AND DEXTRIN

[75] Inventors: Peter Rohringer, Schönenbuch; René Berini, Birsfelden, both of Switzerland

[73] Assignee: Ciba-Geigy Corporation, Ardsley, N.Y.

[21] Appl. No.: 251,422

[22] Filed: Apr. 6, 1981

[30] Foreign Application Priority Data

Jun. 30, 1980 [CH] Switzerland ............... 5014/80

[51] Int. Cl.³ ........................... B32B 33/00
[52] U.S. Cl. ........................... 252/606
[58] Field of Search ........................... 252/606

[56] References Cited

U.S. PATENT DOCUMENTS 3,372,131 3/1968 Rohffs ............... 525/54.25
3,925,137 12/1975 Kamel ............... 252/8.1
4,216,261 8/1980 Dias ............... 428/264

FOREIGN PATENT DOCUMENTS 3772 5/1979 European Pat. Off. .
904954 9/1962 United Kingdom .

*Primary Examiner*—Maurice J. Welsh
*Attorney, Agent, or Firm*—Edward McC. Roberts

[57] ABSTRACT

An intumescent, fire-retardant, aqueous composition which comprises (a) as a flameproofing agent, a water-soluble ammonium salt of a non-volatile inorganic acid, such as sulfamic acid, sulfuric acid or, in particular, phosphoric acid, (b) as a blowing agent, a water-soluble nitrogen compound, for example urea, which can be methylolated, or its derivatives and salts and (c) dextrin as a binder, (d) if desired, formaldehyde, and (e) if desired, further additives, for example wood preservatives, is used for the flameproof and heat-resistant treatment of very diverse substrates, preferably building timber, or for extinguishing burning substrates of all kinds. When the composition is used as a fire-extinguishing agent, it preferably additionally contains a foaming agent, and can contain a foam stabilizer.

29 Claims, No Drawings

FIRE-RETARDANT, INTUMESCENT COMPOSITION AND ITS USE FOR THE FLAMEPROOFING OF SUBSTRATES, AND AS A FIRE-EXTINGUISHING AGENT COMPRISING AN AMMONIUM SALT, A WATER-SOLUBLE NITROGEN COMPOUND AS A BLOWING AGENT AND DEXTRIN

The present invention relates to a fire-retardant, intumescent, aqueous composition, which comprises (a) at least one water-soluble ammonium salt of a non-volatile inorganic acid, as a flameproofing agent, (b) at least one water-soluble nitrogen compound which serves as a blowing agent and splits off ammonia and carbon dioxide when heated, (c) dextrin as a binder, (d) optionally, formaldehyde or a formaldehyde donor and (e) optionally, other additives.

The present invention further relates to the use of the composition defined above for the heat-resistant and fire-retardant finishing of substrates of all kinds, or as a fire-extinguishing agent, to a process for rendering substrates flameproof and heat-resistant or for extinguishing burning substrates, wherein the stated composition is applied to the substrate, and to the substrate flameproofed by the said process.

Suitable non-volatile inorganic acids from which component (a) is derived are sulfamic acid and especially sulfuric acid and phosphoric acid, preferably metaphosphoric acid and most preferredly orthophosphoric acid.

The preferred unsubstituted ammonium salts which constitute component (a) are thus especially ammonium sulfates and more preferredly still ammonium phosphates. The ammonium sulfates can be ammonium bisulfate and especially ammonium sulfate. The ammonium phosphates can be monomeric or polymeric phosphates. Examples of polymeric phosphates include ammonium polyphosphate and ammonium dihydrogen pyrophosphate, and examples of monomeric phosphates include ammonium dihydrogen phosphate and ammonium monohydrogen phosphate. The ammonium polyphosphates are in every case water-soluble polyphosphates, for example triphosphates. Particularly preferred ammonium phosphates are ammonium hydrogen phosphate and ammonium dihydrogen phosphate. Components (a) of exceptional utility are, in particular, ammonium sulfate and more preferably still ammonium monohydrogen phosphate $(NH_4)_2HPO_4$ and ammonium dihydrogen phosphate $NH_4H_2PO_4$.

Suitable components (b) of the composition according to the invention are blowing agents, preferably water-soluble nitrogen compounds, which on exposure to heat, for example from burning substrates, split off ammonia and carbon dioxide, with or without other products. Inter alia, such blowing agents include, in particular, urea, urea derivatives and their salts, which can be partially or completely methylated. Examples of urea derivatives are, in particular, dicyandiamide, guanidine, guanylurea and melamine. Examples of salts are hydrochlorides and especially phosphates. Urea and its derivatives and salts of the stated type decompose at temperatures of about 120° to about 270° C., splitting off ammonia, carbon dioxide and water. Guanidine, guanylurea and its phosphate, and especially urea, are particularly preferred, because of their low decomposition temperatures (which are about 160° C. for guanidine, guanylurea and guanylurea phosphate, and about 130° C. for urea). Urea and guanylurea phosphate, also referred to as carbamylguanidine phosphate, dicyandiamidine phosphate or 1-ureidoguanidine phosphate

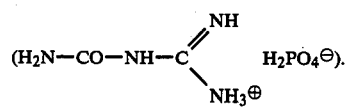

are of particular utility.

Component (c) of the composition can, in principle, be any type of dextrin which is prepared by thermal degradation, appropriately by hydrolysis in an acidic medium, from the corresponding type of starch and which gives homogeneous, clear solutions or pseudo-solutions in water at 20° to 80° C. In particular, water-soluble white and yellow dextrins, which have been prepared by degradation from tapioca starch or, preferably, potato starch, or, more especially still, Indian corn starch, may be used. The presence of component (c) provides the advantage of bonding the flameproofing agents, ie. component (a) of the composition, more firmly to the substrate, thus giving the flameproof finish, achieved by the use of the composition, better resistance to rinsing, splashing and weathering. Accordingly, component (c) employed in the composition constitutes a binder. Dextrins of the type defined above are distinguished, in this application, by their particularly good fixing action, which, when the composition is applied to the substrate by, for example, brushing, manifests itself in a film-forming, non-volatile, transparent, well-adhering coating on the substrate. The use of the stated types of dextrin as component (c) furthermore results in good pourability of the composition and prevents the development of undesirable turbidity—which, if it settles out, is difficult to stir up again—in the composition.

The combination of components (a), (b) and (c) results in intumescent compositions which, when exposed to a flame after having been applied to a substrate, constitute a viscous, foaming, tacky, incombustible, carbonised mass which particularly effectively opposes the spread of flames. Accordingly, component (c) constitutes not only a binder but also a source of carbon.

Examples of suitable formaldehyde donors constituting the optional component (d) of the composition according to the invention are hexamethylenetetramine, trioxane and especially paraformaldehyde, but formaldehyde itself, especially in the form of an aqueous formaldehyde solution, is particularly preferred. Preferably, component (d) is present in order to facilitate dissolution of component (b). The component (d) can either be present in the composition as a mixture with a non-methylolated component (b), or be reacted beforehand with component (b) at an elevated temperature, for example 80° to 100° C., to give a partially or completely methylolated component (b), which is only then added to the composition. If an excess of component (d) over component (b) is employed, and (d) has beforehand been reacted with (b), the components (d) is present in the composition both as such, (ie. as free formaldehyde) and, in a reacted form, in the methylolated component (b) (for example dimethylolurea). Furthermore, if component (d) is formaldehyde, the latter shows a fungicidal and bactericidal action, which comes into effect if the composition according to the invention should happen to be stored, and also comes into effect on the substrate treated with the composition.

Further additives, which can be present as the optional component (e) of the composition, are, in particular, wood preservatives, if wood is a possible substrate. These preservatives offer resistance to the disintegration of wood by wood pests, especially insects, and by fungal attack. They are, in the main, organic or, preferably, inorganic salts of very diverse kinds, which are predominantly water-soluble. Examples of such salts are described in, for example, the textbook on "Wood Preservation" by B. A. Richardson, The Construction Press (1978), pages 124 to 146. According to the invention, water-soluble copper salts, zinc salts and especially alkali metal fluorides are preferred amongst these numerous salts, and sodium fluoride, being an easily obtainable, very effective, water-soluble salt, is more especially preferred.

Preferably, the compositions according to the invention contain the components (a), (b) and (c) and, where relevant, components (d) and (e), in the following ratios, the stated percentages by weight in each case relating to the active ingredient: 5 to 20 percent by weight of component (a), 10 to 30 percent by weight of component (b), 20 to 40 percent by weight of component (c), 0 to 5 percent by weight of component (d) and 0 to 2 percent by weight of component (e).

Where, in another preferred embodiment of the composition, all components (a) to (e) are present, the ratios of the components are as follows, the sum of all components (a) to (e) together with water being 100 percent by weight in each case: 5 to 20 percent by weight of component (a), 15 to 25 percent by weight of component (b), 25 to 35 percent by weight of component (c), 0.3 to 2 percent by weight of component (d), 0.1 to 1 percent by weight of component (e) and 30 to 40 percent by weight of water.

Especially preferred compositions contain 5 to 20 percent by weight of ammonium sulfate, ammonium monohydrogen phosphate or ammonium dihydrogen phosphate as component (a) 15 to 25 percent by weight of urea or methylolated guanylurea phosphate as component (b), 25 to 35 percent by weight of water-soluble white dextrin or yellow dextrin, obtained from Indian corn starch as component (c), 0.5 to 2 percent by weight of a 25 to 35% aqueous formaldehyde solution as component (d), if urea is employed as component (b), 4 to 6 percent by weight of a 25 to 35% aqueous formaldehyde solution as component (d), if guanylurea phosphate is employed as component (b), 0 to 1 percent by weight of sodium fluoride as component (e) and 30 to 40 percent by weight of water, the sum of components (a) to (e) in water being 100 percent by weight in each case. In these compositions, urea or guanylurea phosphate are present in the free form as well as in the partially or completely methylolated form.

The compositions according to the invention are only slightly acidic and in general have a pH of 4 to 6, especially 5 to 5.5. They are therefore particularly suitable for application to acid-sensitive substrates, for example wood. Where, for example, building timber is the substrate, there is accordingly no damage to the wood, and no deterioration in its mechanical properties, such as the load-bearing capacity.

The compositions according to the invention can be obtained by conventional methods, by mixing components (a), (b) and (c) and, where relevant, (d) and (e), in optional sequence, preferably at 10° to 30° C.

In the process for rendering substrates flameproof and/or heat-resistant, wherein the composition according to the invention is used, the said composition can be applied to the substrate by any method, namely, for example, dipping, brushing, spraying or squirting. The method of application largely depends on the substrate. On the other hand, in the process for extinguishing burning substrates, the composition according to the invention is preferably applied in the foamed state, with addition of a surfactant foaming agent, with or without a foam stabiliser, and application is exclusively by spraying.

Dipping, for flameproofing of substrates, is in particular employed if the substrate is in the form of pieces of material, for example wooden beams or other building timber, clap-board, plastic flock etc. In such cases, the substrate is impregnated by dipping in the composition, optionally with stirring and under pressure and/or vacuum, and optionally at an elevated temperature, and is then dried; advantageously, dipping is carried out in an impregnating liquor prepared by diluting the composition according to the invention with a 5-fold to 20-fold amount of water.

It is advantageous to agitate the substrate in the impregnating liquor, where appropriate whilst gripping the substrate in suitable holders; alternatively, the liquor can be circulated whilst the substrate remains static. A third possibility is to agitate both the substrate and the liquor.

As a rule, the impregnation of the substrate with the impregnating liquor is preferably carried out at room temperature or an elevated temperature, for example at 10° to 100° C., preferably at 20° to 50° C. Using the dipping process, wood can advantageously be impregnated under pressure, for example under a gauge pressure of not more than about 10 bar. However, the wood can also be impregnated, in sealed apparatus of conventional construction, by dipping in vacuo, for example at sub-atmospheric pressures ranging to about $-0.1$ bar. In a particular embodiment of the process, which is specifically intended for porous substrates such as wood, the substrate can be impregnated by dipping in the composition and alternately applying vacuum (ie. sub-atmospheric pressure) and pressure (ie. superatmospheric pressure), preferably by working at from about $-0.1$ bar to 10 bar.

In the dipping process, the liquid ratios employed are as a rule from 2:1 to 10:1, preferably from 5:1 to 7:1. The impregnation time depends greatly on the nature and conditions of the impregnation and on the nature of the substrate. In employing the dipping process under normal pressure at, for example, 20° to 50° C., the impregnation requires—depending on the nature, stage of processing, hardness and water absorbency of the substrate employed—for example, 5 to 60 minutes, preferably 15 to 30 minutes, in the case of, for example, clap-board and, for example, 0.5 to 24 hours, preferably 1 to 6 hours, in the case of, for example, wooden beams.

After impregnation, the substrate is dried, in particular at about 15° to 35° C., for example by leaving it exposed to air for 6 to 48 hours, preferably 12 to 24 hours in the case of, for example, wooden beams, or preferably 10 to 14 hours in the case of, for example, clap-board. However, the substrate can also advantageously be dried in a circulating-air drying oven of conventional construction, at temperatures of, for example, 15° to 100° C., preferably 40° to 60° C.

Preferably, the inventive composition can also be applied, for example, by spraying or squirting, using spraying or squirting equipment of conventional construction, or, preferably, by brushing, in general at room temperature. In contrast to the dipping process the composition is as a rule employed undiluted. Thereafter, the coating is as a rule dried in air, ie. at room temperature. Where necessary, a plurality of coats, for example 2 to 7 coats, are applied one on top of the other, advantageously with intermediate drying, preferably at room temperature, between each successive brushing, spraying or squirting treatment. In general, each coat, after drying, gives 100 to 150 g of solids of the composition according to the invention per $m^2$ of substrate, as a film-forming, transparent coating which is sparingly soluble, or insoluble, in water. The total amount applied per unit area depends on the substrate employed. On wooden panels, for example, it suffices to apply 200 to 700 $g/m^2$, which requires 2 to 7 coats, to achieve an intumescent coating, which is of exceptional utility in effectively counteracting the effect and spread of flames.

To increase the weathering resistance, ie. the resistance to washing-off and rinsing-off, of the resulting applied coatings, the ultimate layer of the coating can be covered with a coat of a commercial lacquer, for example a polyacrylic or nitrocellulose lacquer.

The foaming agent, which is preferably added to the composition according to the invention where the latter is preferentially used in the foamed state as an agent for extinguishing burning substrates, can be virtually any commercial ionic or nonionic surfactant which on mixing with air, especially with compressed air, gives a stable foam.

Preferred foaming agents are alkylarylsulfonic acids having 4 to 18 carbon atoms in the alkyl moiety, alkylsulfonic acids and alkyl-sulfates having 8 to 24 carbon atoms, adducts of 5 to 100 alkylene oxide units, having 2 to 4 carbon atoms per unit, with fatty alcohols having 8 to 24 carbon atoms or alkylphenols having 4 to 12 carbon atoms in the alkyl moiety, which adducts can be esterified with sulfuric acid or phosphoric acids, and, where relevant, the alkali metal salts or ammonium salts of the above.

The fatty alcohol can be saturated or unsaturated and contains 8 to 24, preferably 12 to 22, carbon atoms. Examples of such alcohols are octanol, decanol, lauryl alcohol, myristyl alcohol, cetyl alcohol, stearyl alcohol, arachyl alcohol, behenyl alcohol and oleyl alcohol, and their industrial mixtures. The alkylphenols may be monoalkylphenols or dialkylphenols having 4 to 12, preferably 6 to 12, carbon atoms in the alkyl moiety. Ethoxylated alkylphenols or fatty alcohols with a degree of ethoxylation of 10 to 100, especially 10 to 30, are preferred.

The alkylarylsulfonic acids are as a rule monosulfonic acids derived from alkylnaphthalene or, more especially, alkylbenzene, the alkyl moiety in each case having 4 to 18 carbon atoms. Alkylphenylsulfonic acids having 8 to 12 carbon atoms in the alkyl moiety are especially preferred. Alkylsulfonic acids and alkylsulfates as a rule have 8 to 24 carbon atoms in the alkyl moiety, examples being sodium laurylsulfonate, sodium stearylsulfonate, and especially sodium lauryl-sulfate and sodium stearyl-sulfate, which are of particular utility. The fatty alcohol/ethylene oxide or ($C_4$–$C_{12}$)-alkylphenol/ethylene oxide adducts, which can be esterified with phosphoric acids and especially with sulfuric acid, are reaction products of fatty alcohols having 8 to 24, especially 12 to 22, carbon atoms (such as those mentioned) with from 5 to 100 mols of ethylene oxide, or of phenols, substituted by straight-chain or branched alkyl having 4 to 12 carbon atoms (n-butyl, n-hexyl, n-octyl, iso-octyl, tert.-octyl, n-nonyl, iso-nonyl, tert.-nonyl, n-decyl or n-dodecyl) with 5 to 100 mols of ethylene oxide, which adducts can subsequently be esterified and can thereafter be converted to the corresponding alkali metal salts or ammonium salts.

Further surfactants which, according to the invention, can also be employed as foaming agents, are fluoroaliphatic surfactants as described, for example, in U.S. Pat. No. 4,090,967. In particular the AFFF-surfactant fire-fighting agents (AFFF=aqueous film-forming foams), which are also described in U.S. Pat. No. 4,090,967, show good compatibility with the composition according to the invention, consisting of components (a), (b) and (c) and, optionally, (d) and (e).

Examples of the optional stabilisers which can be employed together with the foaming agent are ammonium salts or amine salts of fatty acids having 8 to 24 carbon atoms, and especially fatty alcohols having 8 to 24 carbon atoms, or reaction products of fatty acids of the stated type with alkanolamines having 2 to 6 carbon atoms. The fatty acids salts mentioned are as a rule lithium, sodium, potassium, ammonium, monoethanolamine, diethanolamine, triethanolamine or isopropanolamine salts of, for example, caprylic acid, capric acid, lauric acid, myristic acid, palmitic acid, stearic acid, arachidic acid, behenic acid, lignoceric acid, oleic acid, linoleic acid, linolenic acid, arachidonic acid or coconut fatty acid, as well as their industrial mixtures. Amine salts and ammonium salts are preferred.

Specific examples of fatty alcohols having 8 to 24, preferably 8 to 18, carbon atoms, which can be used as stabilisers, are lauryl alcohol, myristyl alcohol, stearyl alcohol, oleyl alcohol, arachidyl alcohol, behenyl alcohol and especially cetyl alcohol.

The fatty acid/alkanolamine reaction products are obtained from fatty acids having 8 to 24, preferably 8 to 18, carbon atoms, such as those stated above, and alkanolamines having 2 to 6 carbon atoms, such as ethanolamine, isopropanolamine, di-isopropanolamine and especially diethanolamine.

Examples of reaction products of this type, which can be used as stabilisers, are coconut fatty acid diethanolamide, lauric acid diethanolamide and stearic acid diethanolamide.

In general, 2 to 15 percent of foaming agent and 0 to 8 percent of stabiliser, based on the total weight of the composition, are added to the compositions according to the invention which can be used as fire-extinguishing agents.

In the process for extinguishing burning substrates, the composition according to the invention is preferably mixed with 3 to 6 percent of a foaming agent of the stated type and with 30 to 60 percent of water, based on the total weight of the composition, and is foamed, for example with compressed air, and sprayed, in this foamed state, onto the burning substrate. The foaming and spraying with compressed air is advantageously effected in a fire extinguisher of conventional construction, the compressed air being taken from compressed air cylinders (for example at 2–4 bar). When using the stated amount of water and the stated amount of foaming agent, the additional use of a stabiliser is as a rule not necessary in order to obtain a voluminous foam, which is stable during 3 hours. Under the effect of the heat from the burning substrate, the foam carbonises to form a compact insulating layer, which extinguishes the flames and effectively opposes their further spread.

In another preferred embodiment of the process for extinguishing burning substrates, the composition according to the invention is mixed with 8 to 12 percent of a foaming agent of the stated type and 4 to 8 percent of a stabiliser of the stated type, and the mixture is diluted, and at the same time foamed, with a 10-fold to 50-fold amount of water under pressure and is sprayed, in this foamed state, onto the burning substrate. In this case, the simultaneous dilution and foaming are advantageously effected in a water gun with built-in foam pipe of conventional construction. Depending on the nature of the foam pipe and the pressure of the water used in the gun (for example 3 to 6 bar), the arrangement ensures that air is introduced in the ratio of 1:10 (heavy foam pipe) to 1:80 (medium foam pipe). Given the stated relatively high dilution of the composition according to the invention, it is advantageous to employ, in addition to the stated amount of foaming agent, the stated amount of stabiliser, in order to achieve a stable foam having the properties described above.

In addition to the advantages already mentioned, the particularly easy and inexpensive availability, and excellent shelf life of the compositions according to the invention deserve mention. A further advantage is the universal applicability of the compositions to substrates of all kinds.

Thus, for example, burning substrates which can be extinguished with the compositions according to the invention include not only flammable solid objects, for example buildings, means of transportation or paper, but also liquid substrates, for example flammable solvents.

Substrates which can be rendered flameproof and/or heat-stable by means of the compositions according to the invention are in particular building materials, for example of glass, metal, plastic, or wood, which materials may be in very diverse stages of processing. For example, glass panes, metal plates, plastic sheets and wooden timbers, amongst actual building materials, and glass wool, plastic flock or clap-boards as cladding or insulating materials, can be rendered fire-retardant according to the invention. For the purposes of the present invention, flameproof or fire-retardant properties also include stability when exposed to heat. This applies in particular to substrates which are not flammable per se, such as metal and glass. Wood is a particularly suitable substrate for treatment with the compositions according to the invention; the substrate may be, for example, shavings, beams or panels of all types of wood, ie. both materials consisting of soft conifer wood, for example pine and fir, and those consisting of hard deciduous wood, such as oak, beech or eucalyptus. Building timber and pit props can be particularly effectively rendered fire-retardant in accordance with the invention.

In the examples which follow, the percentages stated are in every case percentages by weight.

EXAMPLE 1

An aqueous, viscous, pourable, clear composition which consists of 15% of ammonium dihydrogen phosphate, 20% of urea and 30% of pure (100%) white dextrin obtained from Indian corn starch (employed as a concentrated, aqueous solution) is applied to a board of abachi wood, by applying 3 brush-on coats to the wood, drying for 15 minutes at room temperature being allowed after each coat. The resulting coat on the wood is transparent and non-brittle, and adheres well. The flameproof board cannot be ignited with the flame of a Bunsen burner.

EXAMPLE 2

1, 2, or 3 brushed-on coats of an aqueous, viscous, pourable, clear composition which contains 15% of ammonium dihydrogen phosphate, 20% of urea, 30% of pure white dextrin obtained from Indian corn starch (employed as a concentrated aqueous solution), 1% of a 30% aqueous formaldehyde solution and 0.5% of sodium fluoride, are applied to abachi clap-boards (size: 115×20×3 mm), drying for 10 minutes at room temperature being allowed after each brush-on coat. The coating obtained on the clap-boards is transparent and non-brittle, and adheres well. The coated wood furthermore shows good bactericidal and fungicidal properties.

The coating weight per unit area, and the weight increase of the coated wood, are measured. The results of these measurements are shown in Table I, which follows. The flameproofing effects of the coating are assessed in a combustion box according to DIN No. 53,906 and in a muffle furnace, the results of these tests also being shown in Table I below.

To carry out the test, the individual clap-boards are ignited in a combustion box, in their vertical position, by means of a Bunsen burner, as in the method used to test textiles in DIN No. 53,906, the ignition time (duration of exposure to the burner flame) in the present case being 12 seconds. Thereafter, the combustion residue, in % of the original weight of the coated wood, is determined.

In the muffle furnace, the clap-boards, on a suspending device, ie. again in a vertical position, are exposed to heat at 325°, 375° and 475° C., in each case for 3 and 10 minutes. In this test also, the combustion residue in % of the original weight of the coated wood is thereafter determined.

TABLE I

|  | Treated clap-boards | | | |
| --- | --- | --- | --- | --- |
|  | with 1 brushed-on coating | with 2 brushed-on coatings | with 3 brushed-on coatings | untreated clap-boards (for comparison) |
| Coating weight per unit area (g/m$^2$) | 86 | 169 | 236 | 0 |
| Weight increase (%) | 19 | 38 | 53 | 0 |
| Combustion residue in a combustion box according to DIN 53,906 (%) | 98 | 98 | 98 | 0 |
| Combustion residue in a muffle furnace (%) | | | | |
| after 3 minutes | | | | |
| at 325° C. | 72 | 75 | 70 | 54 |
| 375° C. | 43 | 50 | 49 | 0 |
| 475° C. | 31 | 33 | 34 | 0 |
| after 10 minutes | | | | |
| at 325° C. | 46 | 46 | 46 | 0 |
| 375° C. | 39 | 39 | 41 | 0 |
| 475° C. | 7 | 19 | 26 | 0 |

EXAMPLE 3

The procedure described in Example 2 is followed, but 1 or 2 coats of an aqueous, viscous, pourable, clear composition, which contains 10% of ammonium monohydrogen phosphate, 20% of guanylurea phosphate, 30% of pure white dextrin obtained from Indian corn starch (employed as a concentrated, aqueous solution), 5% of a 30% aqueous formaldehyde solution and 0.5% of sodium fluoride, are brushed onto the abachi clap-boards.

The stated amounts of guanylurea phosphate and of formaldehyde are reacted beforehand, ie. before being introduced into the aqueous composition, for 10 minutes at 95° C. to give a methylolated guanylurea phosphate.

The brushed-on coating obtained on the clap-boards is again transparent and non-brittle, as described in Example 2, and again has good adhesion. The coated wood furthermore again shows good bactericidal and fungicidal properties.

Table II which follows shows the coating weights per unit area and weight increases of the coated wood and the flameproofing effects, determined, as in Example 2, from the combustion residues obtained in the vertical combustion box test and in a muffle furnace.

TABLE II

|  | Treated clap-boards | | Untreated clap-boards (for comparison) |
|---|---|---|---|
|  | with 1 brushed-on coating | with 2 brushed-on coatings |  |
| Coating weight per unit area (g/m²) | 112 | 224 | 0 |
| Weight increase (%) | 25 | 50 | 0 |
| Combustion residue in a combustion box according to DIN 53,906 (%) | 86 | 98 | 0 |
| Combustion residue in a muffle furnace (%) | | | |
| after 3 minutes | | | |
| at 325° C. | 71 | 81 | 54 |
| 375° C. | 42 | 48 | 0 |
| 475° C. | 32 | 27 | 0 |
| after 10 minutes | | | |
| at 325° C. | 51 | 49 | 0 |
| at 375° C. | 43 | 41 | 0 |
| at 475° C. | 28 | 25 | 0 |

EXAMPLE 4

15 mm thick pine panels, 11 mm thick fir blockboard, 5 mm thick Pavatex panels and 13 mm thick chipboard (a mixture of fir, beech and oak), each having an area of 1 m × 1.5 m, are brushed on both sides with the aqueous composition specified in Example 3, to give a coating of 500 g of the composition per m² of specimen, on each side.

The treated specimens described above and, for comparative purposes, the corresponding untreated specimens, are exposed, on a facade test stand, in the open air, to the action of heat at 900° ± 100° C., the specimens being held in a vertical position and their bottom edge being at a distance of 27 cm from the ground. The heat is generated by a battery of 9 propane gas burners on one side of the specimens, the battery being at a distance of 50 cm from the specimen surface and at a distance of 65 cm from the ground. The temperatures of the heat treatment on the side exposed to the fire, and the resulting temperatures at the back, ie. on the cold side of the specimens, are measured with thermocouples. As a measure of the heat insulation, the temperature of the cold side is found, in the case of all the treated specimens, to remain below 150° C. until such time as the specimen fully bursts into flame. On the other hand, no heat insulation is observable in the case of the untreated specimens, since these burst into flame within seconds, ie. immediately after the start of the exposure to heat.

The observed burning characteristics of the individual untreated and treated specimens, as a function of the duration of the heat exposure, are shown in Table III which follows.

TABLE III

| Specimen | Duration of heat exposure | Burning characteristics |
|---|---|---|
| Pine panels (15 mm thick) untreated | 30 seconds | fully alight |
|  | 8 minutes | flame-exposed portion completely burnt away |
| treated with the composition from Example 3 | 8 minutes | small patches of fire |
|  | 9 minutes | self-extinction after turning off the burners |
| Blockboard (11 mm thick) untreated | 30 seconds | flames |
|  | 4 minutes | fully alight |
|  | 5 minutes | continues to burn after switching off the burners |
| treated with the composition from Example 3 | 9 minutes | small patches of fire; flames go out after switching off the burners |
| Pavatex ® (5 mm thick) untreated | 1 minutes | fully alight |
|  | 1½ minutes | burns away completely after switching off the burners |
| treated with the composition from Example 3 | 7½ minutes | small patches of fire |
|  | 9 minutes | self-extinction after switching off the burners |
| Chipboard (13 mm thick) untreated | 50 seconds | flames |
|  | 6½ minutes | burns away completely after switching off the burners |
| treated with the composition from Example 3 | 9 minutes | does not burn and cannot be ignited |

EXAMPLE 5

The procedure followed is as described in Example 4, but using chipboards, as specified in Example 4, which are brushed on both sides with the aqueous composition specified in Example 2, to give a coating of 500 g of composition/m² of specimen.

The fire-retardant effect is assessed, in comparison with untreated chipboard, by the method described in Example 4; in the case of the treated specimens, the temperature of the cold side, which is a measure of the heat insulation, is again found to be less than 150° C.

The observed burning characteristics of the untreated and treated chipboard, as a function of the duration of the heat exposure, is shown in Table IV below.

TABLE IV

| Specimen | Duration of heat exposure | Burning characteristics |
|---|---|---|
| Chipboard (13 mm thick) untreated | 50 seconds | flames |

TABLE IV-continued

| Specimen | Duration of heat exposure | Burning characteristics |
|---|---|---|
| | 6½ minutes | burns away completely after switching off the burners |
| treated with the composition from Example 2 | 9 minutes | does not burn and cannot be ignited |

EXAMPLE 6

A viscous, clear, pourable composition of 15% of ammonium dihydrogen phosphate, 20% of urea, 30% of pure white dextrin from Indian corn starch (employed as a concentrated, aqueous solution), 1% of formaldehyde (30% aqueous solution) and 34% of water, is mixed with 10% (based on the total weight of the composition) of a lauryl-sulfate as a foaming agent and 6% (based on the total weight of the composition) of a foam stabilising mixture of cetyl alcohol and coconut fatty acid diethanolamide in the alcohol:amide weight ratio of 1.5:1.

A steel trough (2.5 m×1.5 m×0.5 m) is placed on 4 pallets (fir, 12 m×0.8 m×0.15 m) in the open air. 50 liters of a solvent mixture (waste solvent) comprising acetone, ethyl acetate, ethanol and toluene, are ignited in the trough, creating flames 30–50 cm high. The composition, containing foaming agent and stabiliser, is then sprayed, by means of a water gun with heavy-foam pipe, in which the composition is foamed with a 50-fold amount of water under a pressure of 5 bar, with simultaneous supply of air in the ratio of 1:15, onto the locus of the fire, from a distance of initially 20 m and finally 10 m. This covers the locus of the fire with a voluminous foam, which completely extinguishes the fire within 5 to 10 seconds. At the same time, the wooden pallets become coated with a layer of foam which remains stable, i.e. does not collapse, for 3 hours.

EXAMPLE 7

The procedure described in Example 6 is followed, but the specified composition is mixed with 4% of the lauryl-sulfate and 46% of water, and the resulting diluted composition is filled into a 10 liter fire-extinguisher.

A fir beam (0.2 m×0.3 m×1.5 m) is then attached to a suspending device, in the open air, and is ignited at the lower end by the action of heat from a propane gas burner (900° to 1,000° C.). After 2 minutes, the lower half of the beam continues to burn of its own accord, with high flames.

The burning beam is sprayed with the foamed composition, containing the lauryl-sulfate, from the fire extinguisher by means of compressed air from a compressed air cylinder (3 bar); within 2 to 5 seconds, the fire is completely extinguished by the resulting layer of foam. On the locus of the fire, the foam carbonises to give a compact, fire-retardant insulating layer, whilst on the areas which have not yet burnt, a voluminous, clinging layer of foam, which is still white, is formed and remains stable, ie. does not collapse, for 3 hours. This layer provides the wood with a fire-retardant finish, ie. on exposure to the propane gas burner for 2 minutes at 900° to 1,000° C. the layer carbonises, giving a foaming insulating layer which cannot be ignited.

On mixing the composition with 3% of AFFF agent according to Example 1 of U.S. Pat. No. 4,090,967 (in place of 4% of the lauryl-sulfate), similar results are achieved.

What is claimed is:

1. A fire-retardant, intumescent aqueous composition, which comprises (a) at least one water-soluble ammonium salt of a non-volatile inorganic acid, as a flameproofing agent, (b) at least one water-soluble nitrogen compound which serves as a blowing agent and splits off ammonia and carbon dioxide when heated, (c) dextrin as a binder, (d) optionally formaldehyde or a formaldehyde donor and (e) optionally, other additives.

2. A composition according to claim 1, wherein component (a) is an ammonium salt of sulfamic acid, of sulfuric acid or of a phosphoric acid.

3. A composition according to claim 1, wherein component (a) is ammonium sulfate, ammonium bisulfate, ammonium polyphosphate, ammonium hydrogen pyrophosphate, ammonium monohydrogen phosphate or ammonium dihydrogen phosphate.

4. A composition according to claim 1, wherein component (a) is ammonium sulfate, ammonium monohydrogen phosphate or ammonium dihydrogen phosphate.

5. A composition according to claim 1, wherein component (b) is melamine, dicyandiamide, guanidine, guanylurea or urea, which compounds can be methylolated, or a salt thereof.

6. A composition according to claim 1, wherein component (b) is guanidine, guanylurea or urea, which compounds can be methylolated, or a phosphate or hydrochloride thereof.

7. A composition according to claim 1, wherein component (b) is guanidine, guanylurea phosphate or urea, which compounds can be methylolated.

8. A composition according to claim 1, wherein component (c) is a water-soluble white dextrin or yellow dextrin obtained from Indian corn starch.

9. A composition according to claim 1, wherein component (d) is paraformaldehyde or an aqueous formaldehyde solution.

10. A composition according to claim 1, wherein component (e) is a wood preservative.

11. A composition according to claim 1, wherein component (e) is at least one water-soluble copper salt, zinc salt or alkali metal fluoride.

12. A composition according to claim 1, wherein component (e) is sodium fluoride.

13. A composition according to claim 1, which comprises 5 to 20 percent by weight of component (a), 10 to 30 percent by weight of component (b), 20 to 40 percent by weight of component (c), 0 to 5 percent by weight of component (d) and 0 to 2 percent by weight of component (e).

14. A composition according to claim 1, which comprises 5 to 20 percent by weight of component (a), 15 to 25 percent by weight of component (b), 25 to 35 percent by weight of component (c), 0.3 to 2 percent by weight of component (d), 0.1 to 1 percent by weight of component (e) and 30 to 40 percent by weight of water.

15. A composition according to claim 1, which comprises 5 to 20 percent by weight of ammonium sulfate, ammonium monohydrogen phosphate or ammonium dihydrogen phosphate as component (a), 15 to 25 percent by weight of urea or methylolated guanylurea phosphate as component (b), 25 to 35 percent by weight of water-soluble white dextrin or yellow dextrin, obtained from Indian corn starch as component (c), 0.5 to 2 percent by weight of a 25 to 35% aqueous formaldehyde solution as component (d), if urea is employed as component (b), 4 to 6 percent by weight of a 25 to 35% aqueous formaldehyde solution as component (d), if guanylurea phosphate is employed as component (b), 0 to 1 percent by weight of sodium fluoride as component (e) and 30 to 40 percent by weight of water.

16. A composition according to claim 1 wherein the pH value is 4 to 6.

17. A process for rendering substrates flameproof and heat-resistant, or for extinguishing burning substrates, which comprises applying the intumescent composition according to claim 1 to the substrates.

18. A process according to claim 17, wherein the composition is applied to the substrate by dipping, brushing, spraying or squirting.

19. A process according to claim 17, wherein the substrate is impregnated by dipping in the composition, which can be diluted with water, and can be stirred, be under pressure and/or vacuum and be at an elevated temperature, the impregnated substrate subsequently being dried.

20. A process according to claim 17, wherein the substrate is provided with one or more brushed-on coats and is dried.

21. A process as claimed in claim 17, wherein the substrate is provided with 2 to 5 brushed-on coats, with drying at room temperature after application of each coat.

22. A process according to claim 17, wherein the composition is foamed in the presence of one or more surfactant foaming agents and, if desired, one or more foam stabilisers, and the burning substrate is sprayed with the foamed composition.

23. A process according to claim 17, wherein the foaming agent employed is an alkylarylsulfonic acid having 4 to 18 carbon atoms in the alkyl moiety, an alkylsulfonic acid or an alkyl-sulfate having 8 to 24 carbon atoms, an adduct of 5 to 100 alkylene oxide units, having 2 to 4 carbon atoms per unit, with a fatty alcohol having 8 to 24 carbon atoms or with an alkylphenol having 4 to 12 carbon atoms in the alkyl moiety, which adduct can be esterified with sulfuric acid or with a phosphoric acid, or, where relevant, an alkali metal salt or ammonium salt of these.

24. A process according to claim 17, wherein the foaming agent is an alkylsulfonic acid or monoalkyl-sulfate having 8 to 22 carbon atoms, or a sodium salt thereof.

25. A process according to claim 17, wherein the stabiliser is an ammonium salt or an amine salt of a fatty acid having 8 to 24 carbon atoms or is a fatty alcohol having 8 to 24 carbon atoms or is a reaction product of a fatty acid having 8 to 24 carbon atoms with an alkanolamine having 2 to 6 carbon atoms.

26. A process according to claim 17, wherein the stabiliser is a fatty alcohol having 12 to 18 carbon atoms or a fatty acid diethanolamide having 8 to 18 carbon atoms in the fatty acid moiety.

27. A process according to claim 17, wherein 2 to 15% of foaming agent and 0 to 8% of stabiliser, based on the total weight of the composition, are employed.

28. A process according to claim 17, wherein the composition is mixed with 3 to 6 percent of a foaming agent and 30 to 60 percent of water, based on the total weight of the composition, and is foamed with compressed air, and the burning substrate is sprayed with the foamed composition.

29. A process according to claim 17, wherein the composition is mixed with 8 to 12 percent of a foaming agent and 4 to 8 percent of stabiliser, based on the total weight of the composition and is diluted, and at the same time foamed, with a 10-fold to 50-fold amount of water under pressure, and the burning substrate is sprayed with the foamed composition.

* * * * *